April 15, 1930.　　　　　C. B. COOK　　　　　1,754,612
LIQUID BATH APPARATUS
Filed Oct. 11, 1926　　　3 Sheets-Sheet 1
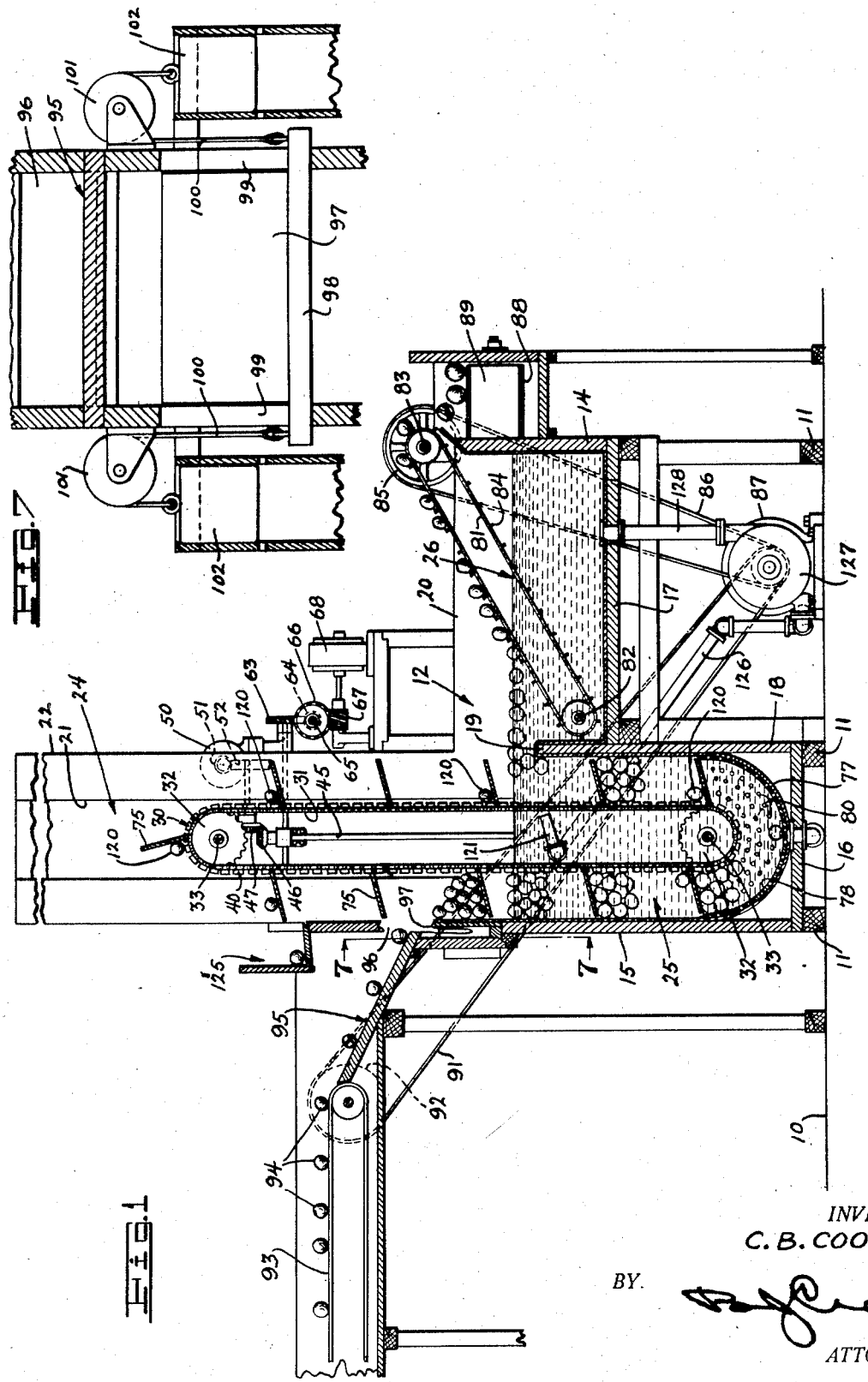
INVENTOR.
C. B. COOK
BY
ATTORNEY.

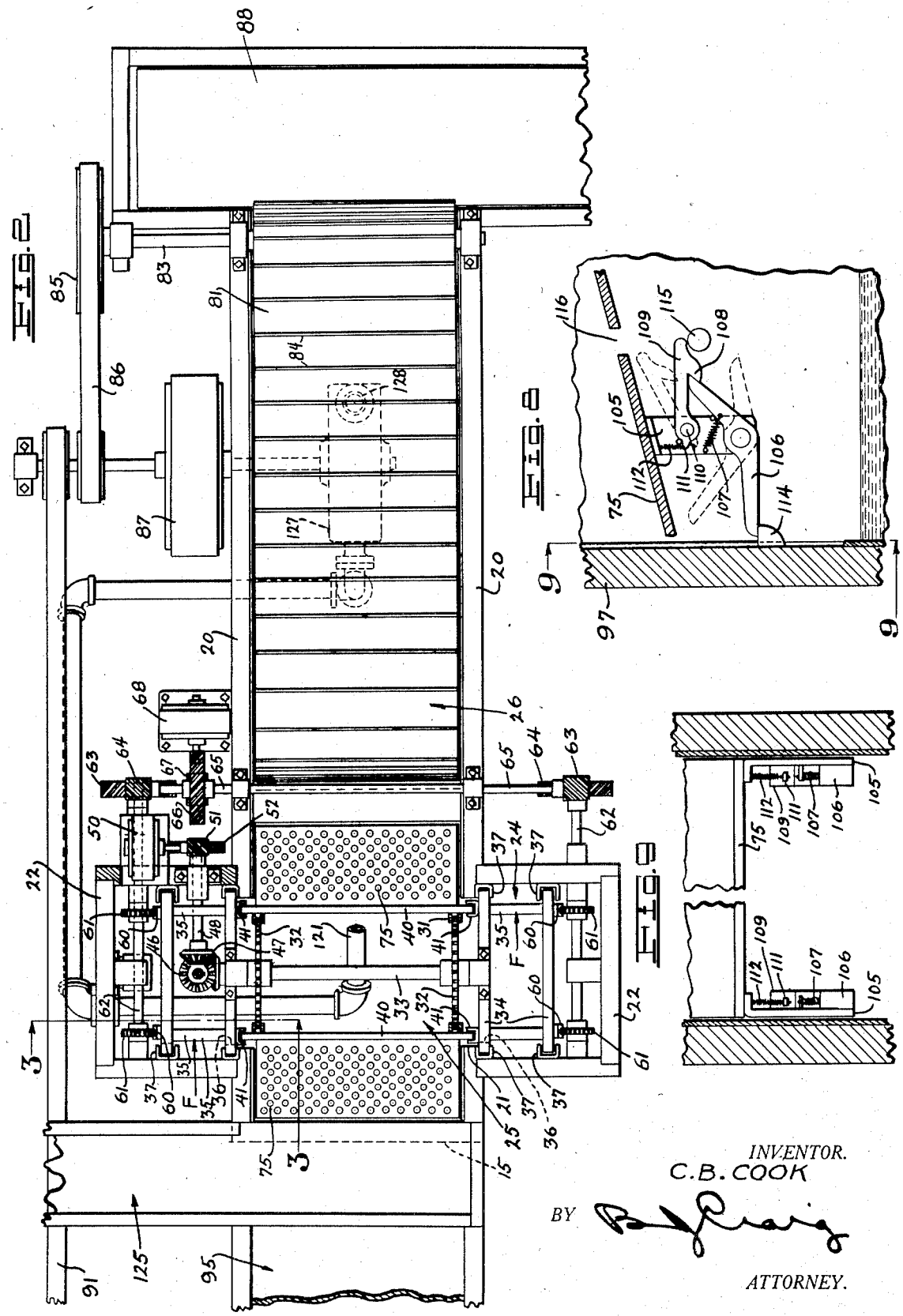

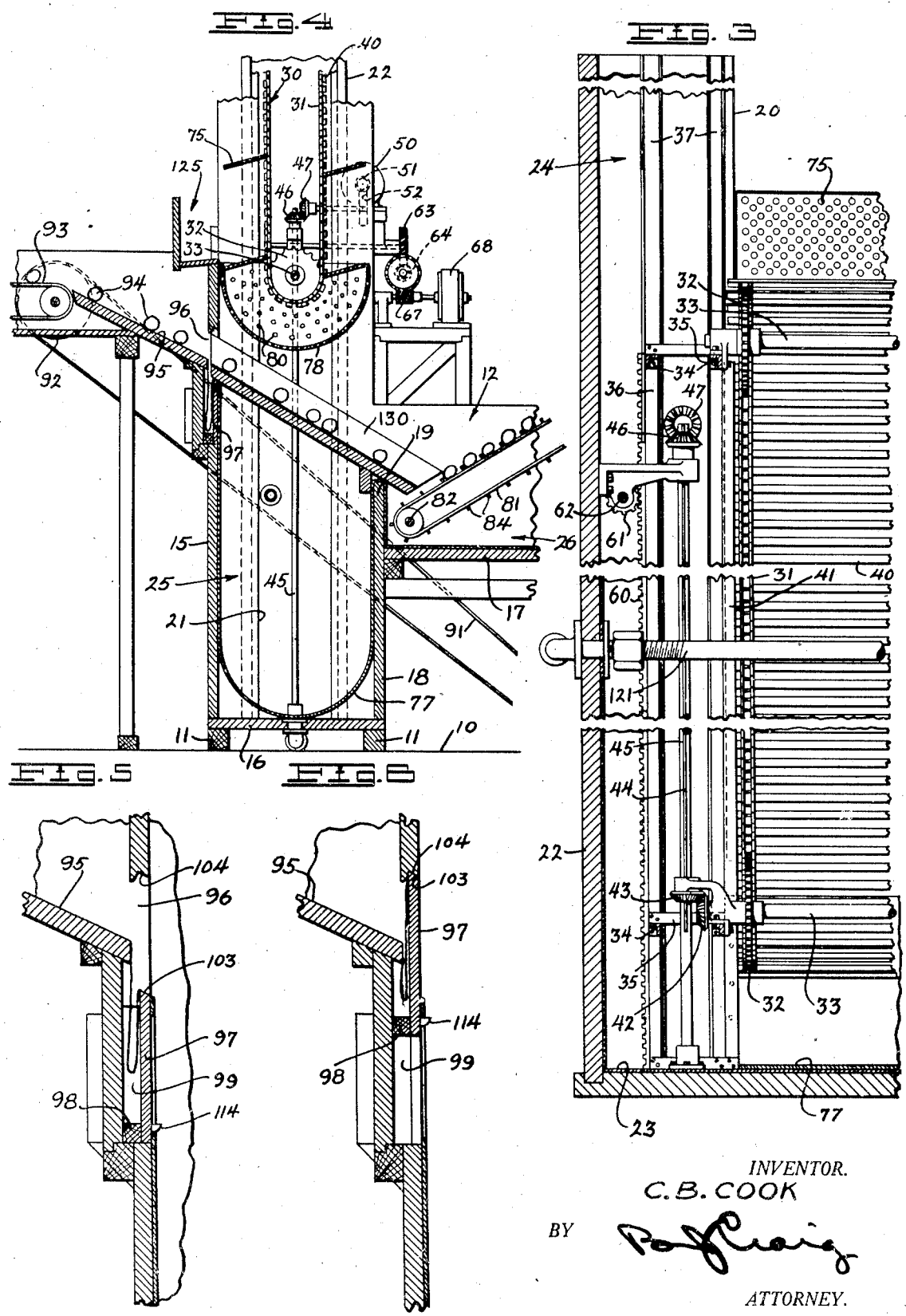

Patented Apr. 15, 1930

1,754,612

UNITED STATES PATENT OFFICE

CHARLES B. COOK, OF LOS ANGELES, CALIFORNIA

LIQUID-BATH APPARATUS

Application filed October 11, 1926. Serial No. 140,737.

This invention relates to liquid bath apparatus.

The general object of the invention is to provide an improved means for treating fruit and other objects with fluid compositions.

A more specific object of the invention is to provide a means for treating fruit with solution wherein a short bath is provided which is of sufficient depth to cause the liquid to exert considerable pressure on the fruit as it passes therethrough.

Another object of my invention is to provide a novel method of preparing fruit for market wherein liquid such as water or borax solution is forced into the pores of the fruit and wherein the liquid is preferably at a temperature of over 100° F.

An additional object of my invention is to provide an improved fresh citrus fruit which is prepared for shipping.

Heretofore in the treatment of fruit with liquid solution it has been customary to pass the fruit through an elongated tank in order to treat the fruit properly. The long tank was deemed essential in order to subject the fruit to the action of the liquid for a considerable time. To overcome this difficulty I provide a deep tank of relatively short length and the fruit is taken to a point near the bottom of this tank where the added fluid pressure due to the depth will cause the solution to more quickly permeate the pores of the fruit so that the latter will be thoroughly impregnated with the material. My invention is partly adapted for treating oranges and other citrus fruits so that they will be in suitable condition for shipment in cars without the use of ice in the cars.

Another object of the invention is to provide an improved bath device for treating fruit with solution wherein means is provided enabling the fruit to pass to different depths in the solution at will, so that the degree of impregnation of the fruit may be carefully adjusted.

Other objects of the invention will be apparent from the following description taken in connection with the accompanying drawing wherein:

Fig. 1 is a central sectional view through a machine embodying the features of my invention;

Fig. 2 is a top plan view of the machine on a larger scale than Fig. 1;

Fig. 3 is a fragmentary sectional view taken on line 3—3, Fig. 2;

Fig. 4 is a fragmentary view similar to Fig. 1 showing the parts in another position;

Figs. 5 and 6 are fragmentary detailed sectional views showing the gate control device;

Fig. 7 is a fragmentary view taken on line 7—7, Fig. 1;

Fig. 8 is a fragmentary sectional detail through one of the elevator flights showing the latch mechanism for operating the gate, and Fig. 9 is a section on line 9—9, Fig. 8.

Referring to the drawing by reference characters, I have shown my device as arranged upon a base 10 which may be a floor. Upon this base 10 I arrange a pair of spaced sills 11. Upon these sills I mount a tank indicated generally at 12. This tank is provided with ends 14, and 15. The tank is provided with a bottom 16 adjacent the end 15 and a bottom 17 adjacent the end 14. The two bottoms are at different levels for a purpose presently to be described and are connected by a wall 18. Between the bottoms 16 and 17 I arrange a partition member 19 which projects above the bottoms 16 and 17.

Engaging the bottom 17 and the ends 14 and 15 are side members 20. These side members have parts removed as at 21 on each side and over these parts I set a boxlike member 22 having a bottom 23 to provide a receptacle 24 in which operating mechanism to be later described is housed.

From the foregoing description it will be seen that I have provided a tank which comprises a deep portion 25 and a shallow portion 26 together with side comparments 24.

Mounted within the compartment 25 I arrange a fruit conveyor indicated generally at 30. This fruit conveyor comprises a pair of endless chains 31 which are mounted on sprockets 32 which are in turn arranged on shafts 33. The shafts 33 are mounted at each end on frames F which constitute cross members 34 and end members 35. There is one of these frames at each end of each shaft and the frames at each end are connected by standards 36 so that the frames move together.

The ends of the cross members of the frame fit in suitable guide members 37 so that they may move freely up and down to thus raise the shafts while maintaining the latter in spaced relation.

The chains 31 are provided with transversely extending slats 40 the ends of which set in guides 41 to keep them in proper alignment. In order to drive the shafts 33 and thereby move the chains 31 I key a bevel gear 42 to the lower shaft 33. This bevel gear meshes with a companion gear 43 which has a key thereon fitting within a slot 44 on a vertically extending shaft 45. This shaft 45 is adapted to be driven by a bevel gear 46 which is in turn driven from a bevel gear 47. This bevel gear 47 is driven by a shaft 48 (see Fig. 2), from a motor 50 through gears 51 and 52. It will thus be apparent that as the frames F are raised and lowered the shafts 33 will remain in the same spaced relation and may be driven from the motor 50.

In order to raise the frames F I provide the outer member 34 of each frame with spaced racks 60. Each of these racks engage spur gears 61 mounted on shafts 62. These shafts 62 are suitably supported and are provided with worm gears 63 which are adapted to be driven by worms 64, the latter of which are fixed on a shaft 65. The shaft 65 is provided with a worm wheel 66 which is adapted to be driven by a worm 67. This worm 67 is shown as arranged on the armature shaft of a motor 68. This motor is of the reversible type and when driven in one direction it will serve to raise the shafts 33 and the associated parts, and when driven in the opposite direction will serve to lower the parts. Due to the use of the worm gears the parts will remain in set positions.

The chains 31 are provided with spaced flights 75. These flights are so secured that normally they project slightly out of perpendicular relation with respect to the plane of the slats 40 on the chains 31.

The flights are of such length that they come into close engagement with the end 15 of the tank and the partition 18 and thus provide an elevator for conveying articles into and from the tank. The tank is provided with a semi-cylindrical bottom 77 and the frames F previously described are likewise provided with a semi-cylindrical false bottom 78. The false bottom 78 moves up and down with the frame so that the flights 75 always move in close relation with this false bottom regardless of the vertical position of the frames in the tank. The bottom 78 is shown as provided with suitable apertures 80 through which the solution in the tank may pass when the frame is being raised or lowered.

The small tank 26 is provided with an endless belt conveyor 81 which is mounted on a shaft 82 at one end and on a shaft 83 at the other end. This conveyor is provided with cleats 84 and the conveyor is adapted to be driven through a pulley 85 by means of a belt 86 which is driven by a motor 87. Adjacent the end of the belt 81 I show a second conveyor belt 88 which is mounted on a pulley 89 adapted to be driven in any suitable manner.

The motor 87 also operates a belt 91 which serves to drive a pulley 92 on which an endless belt conveyor 93 is mounted. This belt conveyor serves to convey the articles to be treated, which are shown as oranges 94, to the delivery chute 95. This delivery chute 95 terminates in an opening 96 arranged in the end 15, of the tank. This opening 96 is adapted to be closed by a gate 97 which is provided at its lower end with a transverse member 98 which works in slots 99 provided beneath the opening 96. This transverse member 98 is provided with a cable 100 at each end, and each cable passes over a pulley 101 to a weight 102. This weight serves normally to hold the gate 97 closed. The gate is preferably provided with a bevelled upper surface 103 which fits a rabbet 104 on the end 15.

Each flight 75 is provided (see Fig. 8) with a trigger device at each side thereof comprising a bracket 105 on which is pivoted a trigger comprising a bell crank 106 which is normally urged in one position by a spring 107. One end of the bell crank 106 engages an ear 108 on a dog 109 which is pivoted at 110 to the bracket 105. The dog 109 has a shoulder 111 which engages a spring 112 to normally keep the ear 108 in engagement with the bell crank 106 to hold the parts in the position shown in Fig. 3.

The gate 97 is provided with blocks 114 which work in slots and as each flight 75 moves downwardly the forward portion of the bell cranks 106 will engage these blocks and will move them downwardly thereby pulling the gate downwardly and opening the apertures 96 so that the fruit can run onto the flight.

In Fig. 8 the gate has just reached a position near its lowest movement and in order to release the gate, I show a pair of pins 115 which each engage the dog 109 and lift this dog thereby freeing the bell crank 106 and causing it to move to the dotted line position in Fig. 8. This releases the door 97 whereupon the weights 102 cause the door to move upwardly to closed position.

Each flight 75 is provided with a recess 11 in the ends thereof through which the pins 115 pass as the flights move downwardly.

The operation of the mechanism described is as follows:

The conveyor 93 moves the oranges forwardly and they run down the chute 95 and strike the door 97. As the sprockets 32 rotate one of the flights is moved downwardly to cause the bell crank 106 to strike one of the projections 114, thereby causing the door to open. This opening action will occur at the time the flight is approximately opposite the delivery end of the chute 95 and as a result the oranges will flow into the pocket of which the flight is the bottom and the flight will move downwardly until it causes the door to close. Another charge of oranges will then accumulate on the chute 95 after which the operation will be repeated.

As the flights move downwardly they carry the oranges with them and as the specific gravity of the oranges is less than that of the solution the oranges will move upwardly against the flight until after they have passed the lowest position after which they will move upwardly and will press against the flight above them. A cull or inferior orange is heavier than the solution and will drop onto the false bottom and will be carried around by the flight so that it will repose in the position shown at 120 in Fig. 1.

As the chains rotate, the oranges approach the upper surface of the solution and are there subjected to the action of the solution forced out of the removable nozzle 121. This fluid pressure is sufficient to cause the oranges to be forced into the small tank 26 and onto the conveyor 84 whence they will pass to the delivery belt 88. The nozzle 121 is removable so that it may be removed when the tank is raised to its extreme upper position.

The cull oranges shown at 120 will rest at the bottom of the flight and on account of the inclination, will not be driven by the fluid from the flight but will pass upwardly and over the topmost position of the elevator and will drop down into the container 125.

In using the device the depth of submergence of the treated fruit may be regulated by moving the elevator up and down thereby changing the depth to which the fruit is taken and thereby controlling the degree of impregnation.

The fluid ejected from the nozzle 121 is carried through a pipe 126 from a pump 127 which receives its supply through a pipe 126 in the bottom of the compartment 26.

The flight 75 may if desired be hinged to the endless member which supports them so that the flights may move through a slight angle.

When it is desired to omit the immersing operation, the elevator is raised to the position shown in Fig. 4 and an inclined chute 130 is placed so that fruit passes directly from the chute 95 to the conveyor 81.

What I claim is:

1. In a fruit treating device, a tank, means for conveying fruit down in the tank, means enabling said fruit to rise in the tank, and other means for shifting said first mentioned means to change the depth of submergence.

2. In a fruit treating device, a tank, an endless conveyor for conveying fruit towards the bottom of the tank, said conveyor also acting to raise the fruit in said tank, means to support said conveyor, said means being shiftable to change the depth of submergence.

3. In a device for treating fruit with fluid, a tank, an elevator arranged in said tank, said elevator including an endless member having flights thereon, said flights being arranged to move downwardly at one end of the tank and upwardly at the other end of the tank, said flights acting in conjunction with the walls of said tank to provide pockets and means to deliver fruit to said pockets, said flights being inclined downwardly towards the tank when in said one end of the tank.

4. In a device for treating fruit with fluid, a tank comprising a compartment, an elevator arranged in said compartment, said elevator having means thereon in conjunction with the walls of said compartment to provide pockets, said tank having an opening therein, means to deliver fruit to said opening, a gate for controlling said delivery means and means to open said gate when each pocket passes said opening.

5. In a device for treating fruit with fluid, a tank, an elevator arranged in said tank, said elevator including a member having spaced flights thereon, said flights acting in conjunction with the walls of said tank to provide pockets, an opening leading to said tank and means to deliver fruit through said opening and a gate for controlling said opening, said gate being movable to open position by said flights.

6. In a device for treating fruit with fluid, a tank comprising a deep compartment and a shallow compartment, an elevator arranged in said deep compartment, said elevator including a pair of spaced chains, sprockets on said chains, spaced shafts for said sprockets, supports for said shafts, and means to bodily lift said shafts together whereby the depth of submergence may be adjusted.

7. In a device of the class described, a fluid holding tank having a well at one end, the bottom of which extends below the bottom of said tank, an elevator in said well, means to deliver fruit to said elevator, means on said elevator to draw the fruit deposited therein toward the bottom of the well, and to raise the fruit after it has been taken towards the bottom of said well, a conveyor in said tank, and means to deliver the fruit from said elevator to the conveyor.

8. In a device for treating fruit with fluid, a tank comprising a compartment, an elevator arranged in said compartment said elevator including a pair of spaced chains, sprockets on said chains, shafts for said sprockets, supports for said shafts, said chains having flights thereon, said flights acting in conjunction with the walls of said compartment to provide pockets, means to deliver fruit to said pockets and a means for controlling the actuation of said delivery means.

9. An apparatus for immersing articles comprising a tank, a shaft arranged in said tank, a second shaft disposed above said first mentioned shaft, sprocket wheels on said shafts, spaced chains on said sprocket wheels, flights on said chains, walls adjacent to said flights, means to move fruit to a position within said walls and upon said flights, means to discharge the fruit from the flights, a conveyor and fluid means to force the fruit to said second conveyor.

10. In a device for treating fruit with fluid, a tank comprising a deep compartment and a shallow compartment, an elevator arranged in said deep compartment, said elevator including a pair of spaced chains, sprockets on said chains, shafts for said sprockets, supports for said shafts, flights on said chains, and means to bodily lift said shafts whereby the depth of submergence may be adjusted, said flights acting in conjunction with the walls of said deep compartment to provide pockets, means to deliver fruits to said pockets and a gate for controlling said delivery means.

11. In a device of the class described, a fluid holding tank having a well at one end thereof deeper than the remaining portion of the tank, a partition between said well and said remaining portion of the tank, an elevator in said well, means to discharge fruit onto said elevator, means on said elevator to draw the fruit deposited therein downward in the tank and to thereafter raise the fruit upward in said tank, a conveyor in said remaining portion of the tank and means to cause transfer of the fruit from said elevator to the conveyor.

12. In a device of the class described, a fluid holding tank having a well at one end thereof deeper than the remaining portion of the tank, a partition between said well and said remaining portion of the tank, an elevator in said well, means to discharge fruit onto said elevator, means on said elevator to draw the fruit deposited therein to the bottom of the tank and to thereafter raise the fruit from the bottom of said tank, a conveyor in said remaining portion of the tank and means to cause discharge of the fruit from said elevator into the remaining portion of the tank, said last mentioned means serving to force the fruit onto the conveyor.

13. In a device for treating fruit with fluid including a tank, a feed opening in said tank, a vertically shiftable elevator arranged in said tank adapted to receive fruit from said opening and to convey it downward and upward in said tank, a conveyor in said tank adapted to receive fruit from said elevator, and means when said elevator is shifted to its uppermost position to transfer fruit directly from said feed opening to said conveyor.

14. In a liquid bath apparatus, a bath including side walls, an elevator having means thereon for engaging and forcing buoyant articles to a position where they are immersed in said bath, other means, including a wall of said bath, associated with said first mentioned means to control the rise of said buoyant articles, an elevator adjacent to said bath for receiving articles from the bath and a conveyor adjacent to said elevator for receiving said articles from said elevator.

15. In a device of the class described, a fluid holding tank including walls, an elevator, means to mount said elevator to move downwardly in one portion of the tank and upwardly in another portion, a plurality of spaced outwardly directed flights secured to said elevator, said flights acting in conjunction with the walls of said tank to provide pockets, said flights including members for engaging the articles in the tank, said members being rigid relative to said conveyor, the lower surface of said members being downwardly inclined on the down side of said tank and means to drive said elevator.

16. In a device for treating fruit, a tank comprising a divided compartment for a treating fluid, an elevating conveyor arranged to travel up and down in said compartment, said conveyor including a pair of spaced chain members, conveyor flights on said chains said flights acting in conjunction with the walls of said compartment to provide pockets, and sprockets mounted in said tank for said chains.

In testimony whereof, I hereunto affix my signature.

CHARLES B. COOK.